Aug. 20, 1957  F. T. TURNER  2,803,792
MOTOR STABILIZER
Filed May 28, 1956  2 Sheets-Sheet 1
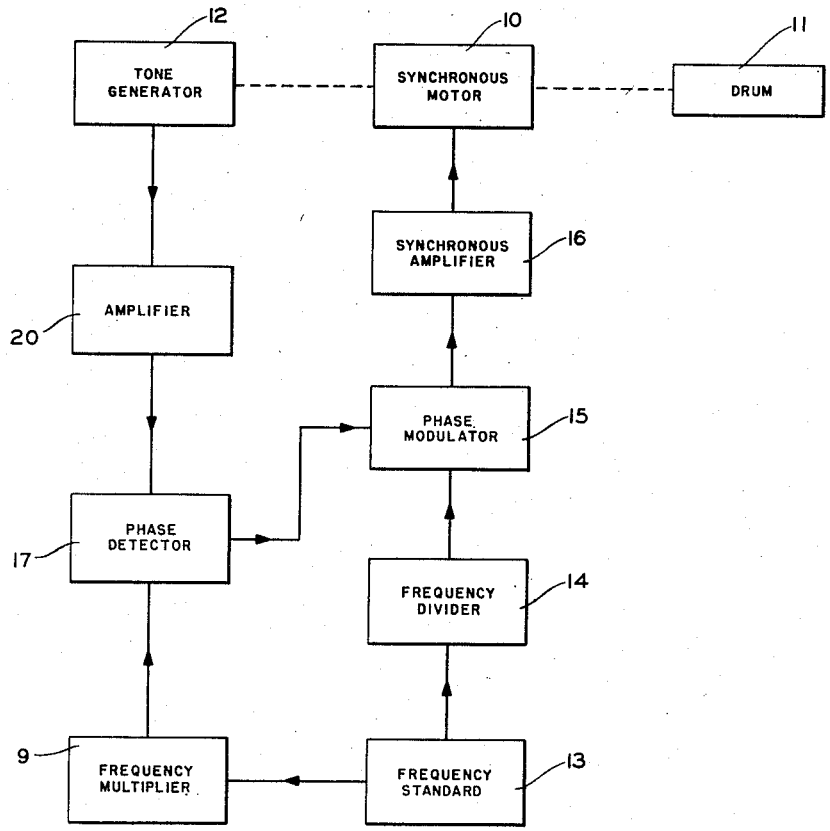
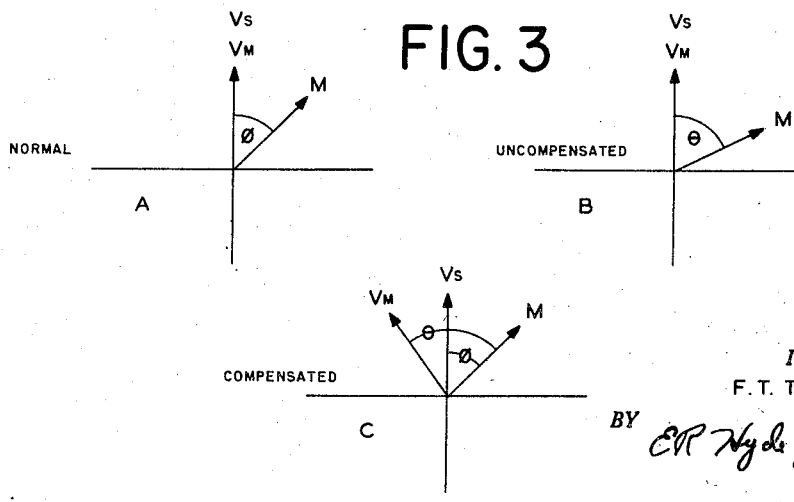
INVENTOR.
F. T. TURNER
BY
ATTORNEY Aug. 20, 1957    F. T. TURNER    2,803,792
MOTOR STABILIZER Filed May 28, 1956    2 Sheets-Sheet 2

INVENTOR.
F. T. TURNER
BY
ATTORNEY ated Aug. 20, 1957

2,803,792
MOTOR STABILIZER

Frank Thomas Turner, Hampton Bays, N. Y., assignor to The Western Union Telegraph Company, New York, N. Y., a corporation of New York Application May 28, 1956, Serial No. 587,650

7 Claims. (Cl. 318—175)

The present invention relates to motor control systems and more particularly to means for maintaining the speed of electric motors constant.

In many systems in which it is desirable and necessary to provide a constant speed electric drive a synchronous motor will generally be satisfactory. However, while a synchronous motor rotates at a constant speed, the slip angle or relative angular displacement of the rotor with respect to the rotating electric field will vary with changes in the applied voltage, bearing friction and load. An application in which variations in the angular displacement of the motor rotor is objectionable is in high-speed facsimile transmission wherein such variations result in defective message copy.

In some constant speed applications, it is inconvenient to use a synchronous motor. For example, some high-speed facsimile apparatus must be designed to operate at adjustable rotational speeds in order to match the transmitted frequency bandwidth with the bandwith of available communication channels. In such systems an adjustable speed motor, such as an induction motor or D. C. motor, is often employed. Thus it is not only necessary to control the relative angular displacement of the rotor but also the rotational speed.

Accordingly, attempts have been made in the past to devise electric motor speed regulation systems to compensate for changes in the angular displacement of the motor rotor and maintain constant speed. One such system is disclosed in U. S. Patent No. 2,715,202 of F. T. Turner, L. G. Pollard and C. R. Deibert in which a carefully controlled standard frequency is provided to run an electric motor which may be of the synchronous type. A tone generator is coupled to the motor shaft and serves to generate a frequency proportional to the angular velocity of the motor rotor and having a phase proportional to the angular displacement of the rotor relative to the angular position of the standard frequency. Both the standard frequency and the tone generated frequency are passed to a phase detector which compares the two and developes an error signal which has a magnitude proportional to the phase difference and a polarity depending on the time relationship between the two frequencies. This error signal is then used to amplitude modulate the standard frequency to vary the power level thereof as fed to the motor. Thus the variations in motor speed or angular displacement are compensated.

Though this system as disclosed in the Turner et al. patent functions satisfactorily for many purposes, it has certain disadvantages. One objection is that excessive amounts of current must be supplied to compensate for large friction loads. The system of the present invention overcomes this and other disadvantages of the prior art systems.

Accordingly, it is an object of the present invention to provide an improved electric motor stabilizing system.

Another object of the present invention is to provide an improved system for maintaining constant speed and relative angular displacement of an electric motor rotor.

Another object of the present invention is to provide a stabilizing system for electric motors wherein the frequency of the driving power is shifted in phase to compensate for variations in the relative angular displacement of the motor rotor.

Another object of the present invention is to provide a stabilizing system for electric motors wherein the frequency of the driving power is shifted in phase to compensate for variations in the rotational speed of the motor.

A further object of the present invention is to provide an improved constant speed drive for facsimile transmitters and receivers.

In accordance with the above objects, the present invention provides an electric motor connected to a constant frequency source. A tone generator is mechanically linked to the motor shaft and therefore generates a frequency which is directly proportional to the speed of rotation thereof and a phase proportional to the angular position of the motor rotor relative to the frequency source. The tone generated frequency and the standard frequency source are then applied to a phase detector which produces a D. C. output the magnitude and sign of which is a function of the phase angle between the two input signals. The output voltage of the phase detector is fed to the D. C. winding of a saturable reactor which together with a fixed resistor forms a phase shifting network which modulates the phase of the frequency source applied to the motor. The arrangement is such that the current through the saturable reactor is continuously modulated in accordance with the output of the phase detector and hence in accordance with the motor load variations.

The invention will be more fully understood from the following description of a specific embodiment thereof taken with the drawings in which:

Fig. 1 is a block diagram of a control system in accordance with the present invention, for use in a facsimile machine;

Fig. 3 shows vector diagrams illustrating principles of the present invention.

Figure 2:
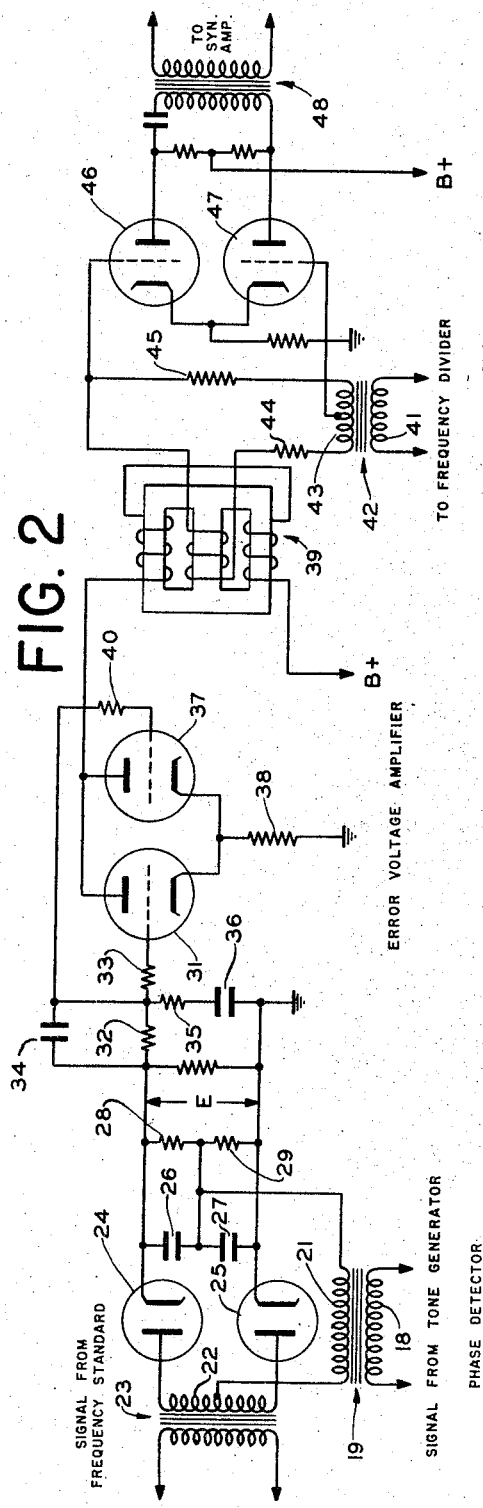
Fig. 2 is a schematic diagram of the phase detector, error voltage amplifier and phase modulator of the system shown in Fig. 1.

Referring now to the drawings and more particularly to Fig. 1, a synchronous motor 10 is connected to drive a facsimile transmitter or receiver message drum 11. A tone generator 12 is also connected to the motor shaft either directly or through a suitable gear or belt arrangement. The tone generator may be of the type shown in the Turner et al. patent and reference may be made thereto for the details of construction thereof. It is sufficient for the present purposes to state that the tone generator comprises a stator having a set of annually arranged teeth and a rotor carrying a set of rotating teeth. The two sets of teeth overlap to form capacitive elements the capacity of which will vary with their relative angular orientation from a maximum when they are directly opposite each other to a minimum when they are at their maximum displacement. Rotation of the tone generator rotor will cause a capacity variation at a frequency depending upon the number of teeth and speed of rotation. For purposes of the present description, it may be assumed that there are 48 teeth in each set and that the speed of rotation is 1800 r. p. m. in which case the capacitance variation will be at a frequency of 1440 cycles per second.

A frequency standard 13 supplies a constant tone which may be, for example, 240 cycles, and serves as the control source for the synchronous motor 10. The output of the frequency standard is divided by frequency divider 14 by a factor of 4 to provide a 60 cycle current which is passed to phase modulator 15, amplifier 16 and then to motor 10. The output of the frequency standard 13 is also passed to a frequency multiplier 9 which in the present example will multiply the 240 cycle tone to 1440 cycles. It is recalled that the tone generator 12 produces a 1440 cycle frequency in phase with the rotor of the synchronous motor 10. This is amplified by amplifier 20 and passed to phase detector 17 along with the 1440 cycle frequency from the standard 13 and multiplier 9. This latter signal will have a frequency proportional to the frequency applied to the synchronous motor and in phase with the rotating field or driving signal to the motor. The output of the phase detector 17 is an error signal proportional to the phase difference between the two 1440 cycle input signals. Since the phase of the 1440 cycle signal from generator 12 represents the actual relative position of the rotor of motor 10 and since the phase of the 1440 cycle signal from frequency multiplier 9 represents the desired or ideal relative position of the motor rotor, the error voltage output of detector 17 will be proportional to the deviation in rotor position from the ideal position. The stability of the reference tone is of a high order, and hence the detector output will be determined by the variations of the signal from the tone generator 12. Any instantaneous variation in the speed of the tone generator will immediately show up in the generated tone. The voltage variation thereby produced in the output of the phase detector is amplified and applied to the D. C. winding of a saturable reactor to continuously modulate the 60 cycle drive signal to the synchronous motor 10.

Reference will now be made to Fig. 2 in considering the circuit arrangement of the phase detector, error voltage amplifier and phase modulator. The amplified output from the tone generator 12 is applied to the primary winding 18 of a transformer 19. One end of the secondary winding 21 of transformer 19 is connected to the center tap of a secondary winding 22 of a transformer 23, the primary of which connects to the frequency standard. The ends of winding 22 of transformer 23 are connected to respective anodes of a pair of diodes 24 and 25 having their cathodes connected to a pair of series connected capacitors 26 and 27 and a pair of series connected resistors 28 and 29. The junction of the capacitors is connected to the junction of the resistors and to one side of secondary winding 21.

The standard 1440 cycle signal is thus applied in phase opposition to the anodes of diodes 24 and 25, and the 1440 cycle signal from the tone generator is applied in phase coincidence to the diodes. When the two signals are in phase quadrature, or 90° out of phase, equal and opposite voltages will be developed across resistors 28 and 29. If there is any deviation in the phase of the signals, unequal voltages will be produced across resistors 28, 29. The magnitude and polarity of the resultant voltage E will depend upon the direction and angle of the phase difference between the standard signal and the tone generated signal. Hence the magnitude of the error voltage E is proportional to the deviation in relative angular position of the motor rotor from the ideal position.

The error voltage E is applied to the grid of tube 31 through resistors 32 and 33 which are included in a network which serves an anti-hunting purpose. This network includes a capacitor 34 connected across resistor 32 and a series combination of resistor 35 and capacitor 36 connected to the junction of resistors 32, 33 and to ground. Thus the voltage applied to the grid of tube 31 is the sum of three signals, one proportional to the error voltage E, one proportional to the derivative thereof, and one proportional to the integral thereof. In this manner a damping action is provided to suppress the hunting that would occur as the motor rotor passed through its in-phase condition. Tube 31 is connected in parallel with tube 37 each having their cathodes joined together and to ground through resistor 38. The grid of tube 37 is connected through resistor 40 to the junction of resistors 32, 33 and the anodes of the tubes are connected together and to one side of the D. C. winding of a saturable reactor 39. A fixed positive potential is applied to the other side of the D. C. winding.

The 60 cycle driving signal from frequency divider 14 is connected to the primary winding 41 of transformer 42. One end of the secondary winding 43 of the transformer connects to a resistor 44, the other end of which is connected to the A. C. winding of the saturable reactor. The other end of secondary winding 43 is coupled to the other side of the A. C. winding through a resistor 45. The saturable reactor 39 along with the fixed resistor 44 forms a phase shifting network for the 60 cycle signal. The value of the fixed resistor 44 is chosen to produce a 90° phase shift in the network with no output from the phase detector. Thus the current through the D. C. winding of the saturable reactor will vary in accordance with the error voltage resulting in a continuous phase modulation of the 60 cycle signal.

The output of the phase shifting network is coupled to the grids of tubes 46 and 47 which are arranged in push-pull. The output of the amplifier is shunt connected to the primary of the output transformer 48 which supplies the driving voltage to the synchronous amplifier.

In considering the operation of the stabilization circuit reference will be made to Fig. 3 which illustrates vectorially the relative relationships between the standard voltage $V_s$, the voltage $V_m$ applied to the motor, and the motor armature M. With the motor running at constant speed under normal conditions, the standard voltage $V_s$ generated by the frequency standard 13 (Fig. 1) will be in phase with the rotating field $V_m$ applied to the synchronous motor 10, and the motor rotor will lag the rotating field by a fixed angle $\phi$ as shown in Fig. 3a. An increase in bearing friction or load would cause a momentary reduction in speed in that the motor rotor will fall further behind the rotating field $V_m$. This condition, uncompensated for, is illustrated in Fig. 3b wherein the increased lag angle is represented by $\theta$. However, with the stabilization arrangement of the present invention, as soon as the motor rotor falls behind the rotating field $V_s$ by an angle greater than $\phi$, the change is reflected in the signal generated by tone generator 12. This causes an error voltage to develop as described above to shift the phase of the 60 cycle driving signal to the synchronous motor 10. In the example illustrated in Fig. 3c, the motor voltage $V_m$ is advanced in phase to a point wherein the motor rotor M is again $\phi$ degrees behind the ideal rotating field or standard signal $V_s$.

Figure 4:
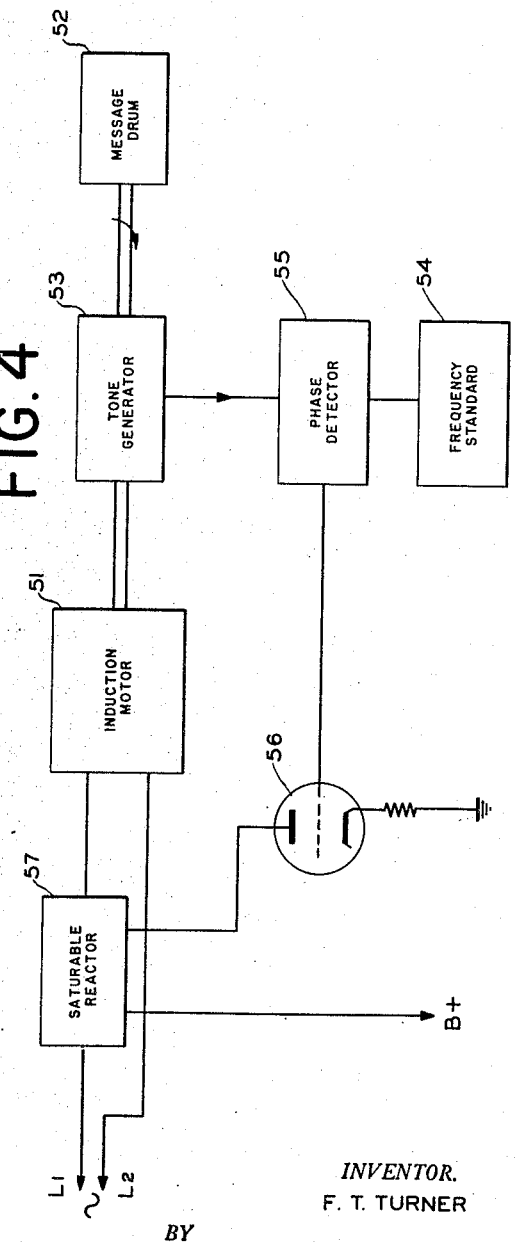
Fig. 4 illustrates a modification of the system shown in Fig. 1.

Fig. 4 illustrates a facsimile control system wherein an induction motor 51 is employed to drive a message drum 52. It is understood that in some facsimile apparatus, the message drum would be replaced by a stylus scanning mechanism. The motor 51 is driven by a local A. C. source over lines L1 and L2. A tone generator 53 which may be similar to the tone generator 12 of Fig. 1 is mounted on a common shaft with the motor and message drum to produce a signal in phase with the induction motor rotor. An ideal rotating field is provided by frequency standard 54 which is applied to a phase detector 55 along with the signal from the tone generator. This phase detector is similar in construction to that described in Fig. 2 and produces an error voltage having a magnitude and polarity representing the relative phase of the ideal rotating field and the tone generator signal which in turn represents the deviation in rotor position from the ideal position. The error voltage thus produced is applied to the grid of a triode 56 having the D. C. winding of a saturable reactor 57 in the plate circuit thereof. The A. C. winding of the saturable reactor is interposed in the local A. C. line supplying the induction motor.

It is seen therefore that a change of speed of motor 51 as a result of variations in load, bearing friction or applied voltage will be reflected in the relative phase of the motor rotor and standard frequency. This phase shift will produce an error voltage which in turn will vary the plate current of tube 56 to modulate the supply voltage to the motor. Thus the A. C. driving voltage from lines LL, L2 is continuously modulated to compensate for variations in motor speed.

Though the present invention has been described with reference to specific embodiments thereof, it is understood that these are not to be considered as limiting the invention as defined in the appended claims.

What is claimed is:

1. An electric motor stabilizing system to control the position of a synchronous electric motor rotor relative to the position of an ideal rotating electric field comprising a source of a first signal, means to develop an alternating current having a phase and frequency proportional to the phase and frequency respectively of said first signal, means to apply said alternating current to the electric motor, means to provide a second signal having a frequency proportional to the angular velocity of the motor rotor and a phase proportional to the angular position of the rotor relative to said first signal, phase sensitive detector means, means to apply said first and second signals to the detector means to produce an error voltage having a magnitude proportional to the phase difference between the first and second signals and a polarity dependent on the time relationship of said signals, phase modulator means to control the phase of said alternating current relative to the phase of the first signal thereby to adjust the angular position of the motor rotor relative to said first signal, and means to apply said error voltage to said modulator means.

2. An electric motor stabilizing system to control the position of a synchronous electric motor rotor relative to the position of an ideal rotating electric field comprising a source of a first signal, means to develop an alternating current having a phase and frequency proportional to the phase and frequency respectively of said first signal, means to apply said alternating current to the electric motor, a tone generator coupled to said electric motor to provide a second signal having a frequency proportional to the angular velocity of the motor rotor and a phase proportional to the angular position of the rotor relative to said first signal, phase sensitive detector means, means to apply said first and second signals to the detector means to produce an error voltage having a magnitude proportional to the phase difference between the first and second signals and a polarity dependent on the time relationship of said signals, phase modulator means to control the phase of said alternating current relative to the phase of the first signal thereby to adjust the angular position of the motor rotor relative to said first signal, and means to apply said error voltage to said modulator means.

3. An electric motor stabilizing system to control the position of an electric motor rotor relative to the position of an ideal rotating electric field comprising a source of a first signal, means to develop an alternating current having a phase and frequency proportional to the phase and frequency respectively of said first signal, means to apply said alternating current to the electric motor, means to provide a second signal having a frequency proportional to the angular velocity of motor rotor and a phase proportional to the angular position of the rotor relative to said first signal, phase sensitive detector means, means to apply said first and second signals to the detector means to produce an error voltage having a magnitude proportional to the phase difference between the first and second signals and a polarity dependent on the time relationship of said signals, phase modulator means including a saturable reactor having circuit means connecting said saturable reactor in circuit with said alternating current and means to apply said error voltage to the saturable reactor whereby the phase of said alternating current relative to said first signal is controlled in accordtnce with said error voltage.

4. An electric motor stabilizing system to control the position of an electric motor rotor relative to the position of an ideal rotating electric field comprising a source of a first signal, means to develop an alternating current having a phase and frequency proportional to the phase and frequency respectively of said first signal, means to apply said alternating current to the electric motor, means to provide a second signal having a frequency proportional to the angular velocity of the motor rotor and a phase proportional to the angular position of the rotor relative to said first signal, phase sensitive detector means, means to apply said first and second signals to the detector means to produce an error voltage having a magnitude proportional to the phase difference between the first and second signals and a polarity dependent on the time relationship of said signals, phase modulator means including a saturable reactor having an A. C. winding and a D. C. winding, circuit means connecting said A. C. winding in circuit with said alternating current, other circuit means intercoupling the output of said detector means and said D. C. winding whereby the phase of said alternating current relative to said ideal rotating field is controlled in accordance with said error voltage.

5. An electric motor stabilizing system to control the position of an electric motor rotor relative to the position of an ideal rotating electric field comprising a source of a first signal, means to develop an alternating current having a phase and frequency proportional to the phase and frequency respectively of said first signal, means to apply said alternating current to the electric motor, a tone generator coupled to said electric motor to provide a second signal having a frequency proportional to the angular velocity of the motor rotor and a phase proportional to the angular position of the rotor relative to said first signal, phase sensitive detector means, means to apply said first and second signals to the detector means to produce an error voltage having a magnitude proportional to the phase difference between the first and second signals and a polarity dependent on the time relationship of said signals, phase modulator means including a saturable reactor having an A. C. winding and a D. C. winding, circuit means connecting said A. C. winding in circuit with said alternating current, other circuit means to apply said error voltage to said D. C. winding whereby the phase of said first signal relative to said ideal rotating field is controlled in accordance with said error voltage to adjust the angular position of the motor rotor.

6. An electric circuit arrangement for controlling the position of a synchronous electric motor rotor relative to the rotating electric field thereof, said relative position being sensitive to changes in bearing friction, load and driving voltage of the motor, comprising a source of alternating current, a phase modulator including a saturable reactor coupled to said source of alternating current, means intercoupling said phase modulator and said electric motor thereby to apply alternating current to the electric motor as a driving voltage and to produce said rotating field in said motor, means to derive a first signal from said alternating current source having a phase proportional to said rotating field, a source of a second signal having a phase proportional to the instantaneous angular position of said motor rotor and a frequency equal to the frequency of said first signal, a phase sensitive detector circuit, means to apply said first signal to the detector circuit, means to apply said second signal to the detector circuit to thereby produce an error voltage having a magnitude proportional to the phase difference between the first and second signals and a polarity dependent on the time relationship between said first and second signals, means to apply said error voltage to said phase modulator to vary the phase of the alternating current applied to the motor relative to said ideal rotating field thereby to adjust the angular position of the motor rotor relative to said rotating field.

7. An electric circuit arrangement for controlling the position of a synchronous electric motor rotor relative to the rotating electric field thereof, said relative position being sensitive to changes in bearing friction, load and driving voltage of the motor, comprising a source of alternating current, a phase modulator including a saturable reactor coupled to said source of alternating current, amplifier means intercoupling said phase modulator and said electric motor thereby to apply alternating current to the electric motor as a driving voltage and to produce said rotating field in said motor, means to derive a first signal from said alternating current source having a phase proportional to said rotating field, a source of a second signal having a phase proportional to the instantaneous angular position of said motor rotor and a frequency equal to the frequency of said first signal, said source of said second signal comprising a tone generator having a stator member and a rotating member driven by said electric motor, a phase sensitive dector circuit, means to apply said first signal to the detector circuit, means to apply said second signal to the detector circuit to thereby produce an error voltage having a magnitude proportional to the phase difference between the first and second signals and a polarity dependent on the time relationship between said first and second signals, means to apply said error voltage to said phase modulator to vary the phase of the alternating current applied to the motor relative to said ideal rotating field thereby to adjust the angular position of the motor rotor relative to said rotating field.

No references cited.